United States Patent
Naedele et al.

(10) Patent No.: US 8,314,694 B2
(45) Date of Patent: Nov. 20, 2012

(54) SYSTEM AND METHOD FOR SUPPRESSING REDUNDANT ALARMS

(75) Inventors: Martin Naedele, Zürich (CH); Christian Frei, Fislisbach (CH); Patrick Sager, Oberägeri (CH); Alexander Fay, Hamburg (DE)

(73) Assignee: ABB Research Ltd, Zürich (CH)

( * ) Notice: Subject to any disclaimer, the term of this patent is extended or adjusted under 35 U.S.C. 154(b) by 1085 days.

(21) Appl. No.: 11/630,953

(22) PCT Filed: Jun. 28, 2004

(86) PCT No.: PCT/CH2004/000403
§ 371 (c)(1),
(2), (4) Date: Jul. 25, 2008

(87) PCT Pub. No.: WO2006/000110
PCT Pub. Date: Jan. 5, 2006

(65) Prior Publication Data
US 2008/0316015 A1  Dec. 25, 2008

(51) Int. Cl.
  G08B 29/00  (2006.01)
  G08B 23/00  (2006.01)
  G06F 11/30  (2006.01)
  G21C 17/00  (2006.01)
  G05B 13/02  (2006.01)

(52) U.S. Cl. ........ 340/506; 540/517; 702/183; 702/186; 700/47

(58) Field of Classification Search ............ 340/506
See application file for complete search history.

(56) References Cited

U.S. PATENT DOCUMENTS

| | | | |
|---|---|---|---|
| 4,538,138 A * | 8/1985 | Harvey et al. | 340/521 |
| 5,581,242 A | 12/1996 | Arita et al. | |
| 6,124,790 A | 9/2000 | Golov et al. | |
| 6,327,550 B1 * | 12/2001 | Vinberg et al. | 702/186 |
| 6,594,236 B1 | 7/2003 | Lee | |

OTHER PUBLICATIONS

T. Marcu et al., Dynamic Functional-Link Neural Networks Genetically Evolved Applied to Fault Diagnosis, IEEE, 7th European Control Conference ECC'03, Sep. 1-4, 2003, University of Cambridge, UK, pp. 1-6.
International Search Report dated Mar. 9, 2005.

* cited by examiner

*Primary Examiner* — Jennifer Mehmood
*Assistant Examiner* — John Mortell
(74) *Attorney, Agent, or Firm* — Buchanan Ingersoll & Rooney PC

(57) ABSTRACT

The present invention is concerned with an alarm system and a method for suppressing redundant alarms in a monitored system. The alarm system comprises a process control unit, an FDI unit, a filter, and an alarm display unit. The process control unit detects anomalies in the monitored system and generates alarms corresponding to them. The FDI unit diagnoses failures in the monitored system and generates a failure-cause-effect graph comprising a list of generated alarms, along with the alarms corresponding to the causes and effects of each listed alarm. The FDI unit dynamically updates the failure-cause-effect graph concurrently with the generation of alarms by the process control unit and the diagnosis of failures by the FDI unit. The filter receives the generated alarms and identifies redundant and not-yet-classified alarms from the received alarms, by using the failure-cause-effect graph. The filter suppresses the identified redundant alarms and passes on non-redundant and the not-yet-classified alarms to the alarm display unit, for display.

11 Claims, 4 Drawing Sheets

SYSTEM AND METHOD FOR SUPPRESSING REDUNDANT ALARMS

FIELD OF THE INVENTION

The invention relates to the field of failure diagnosis and alarm systems. More specifically, the invention relates to the suppression of redundant alarms corresponding to failures occurring in a system being monitored.

BACKGROUND OF THE INVENTION

All large as well as small-scale systems, such as manufacturing units, processing units, nuclear plants, computer networks, etc., are generally provided with a failure monitoring unit. The failure monitoring unit ensures the safe operation of the system being monitored, by generating alarms corresponding to each failure detected by it. The failure monitoring unit is coupled to an alarm system, which displays the generated alarms, thereby informing a user about the occurrence of a failure in the monitored system.

The failure monitoring unit generates alarms corresponding to failures in the monitored system by using pre-defined criteria, such as a process variable exceeding its threshold value. Process variables include the parameters upon which the safe working of the monitored system depends. For example, in a steel manufacturing unit, the process variables include temperature and pressure inside a reactor; in a computer network the variables may include time out parameter applicable to the network, etc. Very often, alarms are generated due to a slight deviation of the process variables from a desired value, and do not correspond to a critical system failure. These alarms are termed as nuisance alarms. Most conventional alarm systems display even the nuisance alarms.

In other situations, a critical failure, which affects many parts of the monitored system, leads to the generation of a very large number of alarms. Most of these alarms are generated due to the same root failure and correspond to the various degrees of the failure and the process variables involved in the failure. Hence, generally, the alarms generated by the failure monitoring unit corresponding to failures in the monitored system are related. This is because a particular alarm is either a cause or an effect of a previously generated alarm, thereby making most of the generated alarms redundant.

For example, consider that at an instant a first alarm is generated corresponding to the failure of a node in a LAN network, and at the next instant a second alarm is generated corresponding to the failure of a peripheral device attached to the node. In this case the second alarm corresponds to an effect of the previously generated first alarm because the failure of the peripheral device is a direct consequence of the failure of the node. Hence, the second alarm is a redundant alarm. In other words, the first alarm is a cause of the second alarm, thereby making the two alarms related to each other.

Hence, the failure-monitoring unit generates a large number of alarms corresponding to a sequence of failures in the monitored system. If the alarm system displays all the generated alarms, it becomes difficult for a user managing the monitored system to experimentally judge and locate the important alarms corresponding to a root failure from the large number of alarms being displayed at a particular instant. Hence, the user is unable to react to the root failure that is causing the alarms being displayed, and the alarm system is rendered useless.

Conventionally, various alarm systems have been designed with the objective of suppressing redundant alarms, thereby preventing them from being displayed.

U.S. Pat. No. 5,581,242 titled 'Automatic alarm display processing system in plant' relates to a method for automatically selecting important alarms from the alarms generated in a plant operation monitoring system. The method involves suppression of an alarm if the conditions for alarm suppression are met. The conditions for alarm suppression are stored in a causal table.

U.S. Pat. No. 6,594,236 titled 'Alarm suppressing method for optical transmission apparatus' relates to an alarm suppressing method for an optical transmission apparatus. The method involves an analysis of the relation between a root alarm and the subsequent alarms, which are generated subsequent to the root alarm and are referred to as, propagation alarms.

There are certain limitations associated with the prior art alarm systems and methods. Some of these alarm systems use hard coded alarm suppression rules. The alarm systems use these rules to decide which of the related alarms generated by the failure monitoring units are redundant. The alarm systems then suppress the redundant alarms and display only the non-redundant ones. These alarm suppression rules are generally based on an alarm source containment hierarchy. The alarm source containment hierarchy is a previously made list of all the possible failures that can occur in the monitored system along with the causes and effects of the failures. In accordance with the alarm suppression rules, the alarm systems suppress the alarms corresponding to the effects of a failure. Hence, these alarm systems succeed in preventing a large number of related alarms from being displayed. However, the hard coded alarm suppression rules may hide the concurrent occurrence of multiple failures in the monitored system. This may lead to no alarm being displayed, corresponding to some of the concurrently occurring unrelated failures. In addition, the operation of conventional alarm systems is not flexible, and setting them up and maintaining them is cumbersome.

Another method used to suppress redundant alarms involves the suppression of the alarms on the basis of the 'time stamps' associated with them. All the alarms occurring at a later time, with respect to a base alarm, are suppressed. However, the alarm systems employing this method of alarm suppression require a very high time resolution and highly synchronised system clocks. In many situations, this method also, may hide the concurrent occurrence of multiple failures in the monitored system. In general, these alarm systems are prone to synchronisation inaccuracies and delays. In addition, it is difficult to conclude causality from the time sequence of alarms generated in the monitored system.

Hence, the existing alarm systems are not capable of dynamically suppressing redundant alarms concurrently with their generation in the monitored system. These alarm systems are also not capable of displaying non-redundant alarms without a significant time lag between the generation of the alarm and the presentation of the alarm. In addition, the existing alarm systems are not capable of preventing the suppression of an alarm, corresponding to a critical failure in a situation where multiple failures occur concurrently in the monitored system.

DESCRIPTION OF THE INVENTION

It is therefore an objective of the invention to provide a system and method for suppressing redundant alarms and displaying non-redundant and not-yet-classified alarms. These objectives are achieved by implementing an alarm system according to claim 1, method of suppressing redundant alarms according to claim 8 and a computer program product for suppressing redundant alarms according to claim 11. Further preferred embodiments are evident from the dependent patent claims.

In accordance with an embodiment of the invention, an alarm system capable of suppressing redundant alarms is provided. The alarm system comprises at least one process control unit for detecting anomalies in a system being monitored and generating alarms corresponding to the detected anomalies; a fault diagnosis and isolation (FDI) unit for diagnosing failures in the monitored system; a filter coupled to the FDI unit and the process control unit; the filter managing alarms, and at least one alarm display unit coupled to the filter for displaying the identified not-yet-classified alarms and non-redundant alarms. In accordance with another embodiment of the present invention, the filter is coupled to the FDI unit and, via the alarm display unit, to the process control unit.

The FDI unit generates a failure-cause-effect graph comprising alarms corresponding to at least one cause and at least one effect of each alarm corresponding to a diagnosed failure. The FDI unit dynamically updates the failure-cause-effect graph concurrently with the generation of alarms by the process control unit and the diagnosis of failures by the FDI unit. The filter performs alarm management by identifying redundant alarms and not-yet-classified alarms by using the generated failure-cause-effect graph. An alarm corresponding to a detected anomaly is identified as a not-yet-classified alarm if it is not listed in the failure-cause-effect graph.

In accordance with a first preferred variant of the invention, the filter identifies the redundant alarms by performing a comparison or logical classification of an alarm corresponding to a detected anomaly with respect to the alarms corresponding to at least one cause and at least one effect of a diagnosed system failure listed in the failure-cause-effect graph.

A previously displayed alarm is identified as a redundant alarm if a new alarm corresponding to a detected anomaly is diagnosed as a cause of the previously displayed alarm. In other terms, the previously displayed alarm is identified as a redundant alarm if the failure leading to the generation of or diagnosed cause for this previously displayed alarm is identified as one of the effects of the failure leading to the generation of the new alarm. The previously generated alarm corresponding to a previously diagnosed failure or a previously detected anomaly corresponding to a detected anomaly is identified as a redundant alarm if it is one of the determined effects of a previously displayed alarm. In other terms, the new alarm is identified as a redundant alarm if the failure leading to the generation of or diagnosed as cause for a previously displayed alarm is identified as one of the causes of the failure leading to the generation of the new alarm; the previously generated alarm corresponding to a previously diagnosed failure or a previously detected anomaly.

In a second preferred variant of the invention, an alarm previously identified, as a redundant or a not-yet-classified alarm, is re-identified as a redundant or a non-redundant alarm when the failure-cause-effect graph is updated.

In a third preferred variant of the invention, the alarm display unit also displays the reasons for suppressing the redundant alarms.

In accordance with another embodiment of the invention, a method of dynamically suppressing redundant alarms in a system being monitored is provided. The method uses the failure-cause-effect graph for suppressing the redundant alarms. The method comprises detecting at least one anomaly in the monitored system; diagnosing at least one failure in the monitored system; identifying an alarm corresponding to a detected anomaly as a not-yet-classified alarm if the alarm corresponding to the detected anomaly is not listed in the failure-cause-effect graph; identifying an alarm corresponding to a diagnosed failure as a redundant alarm by comparison or logical classification of the alarm with respect to alarms corresponding to at least one cause and at least one effect of a diagnosed system failure listed in the failure-cause-effect graph; suppressing the identified redundant alarm and displaying a non-redundant alarm and the identified not-yet-classified alarm.

BRIEF DESCRIPTION OF THE DRAWINGS

The subject matter of the invention will be explained in more detail in the following text with reference to preferred exemplary embodiments illustrated in the attached drawings, of which:

FIG. 2 depicts a flow chart for a method for dynamically suppressing redundant alarms, in accordance with the exemplary embodiment of the invention illustrated in FIG. 1a;

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
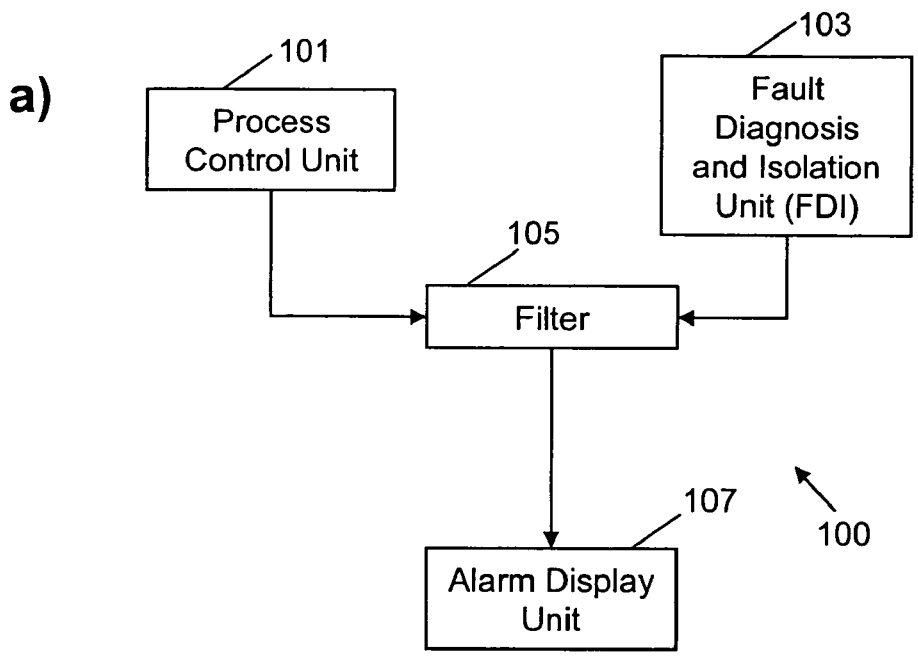
FIG. 1a depicts an alarm system, in accordance with an exemplary embodiment of the invention.
FIG. 1b depicts an alarm system, in accordance with another embodiment of the invention.
Figure 1:
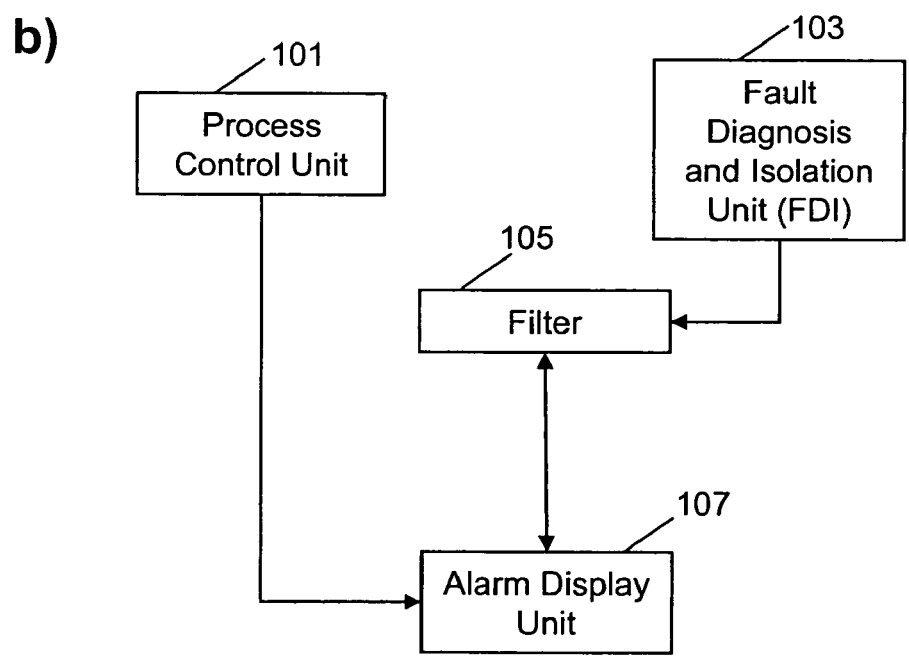

FIG. 1a depicts an alarm system 100 in an exemplary embodiment of the present invention. Alarm system 100 comprises a process control unit 101, a fault diagnosis and isolation (FDI) unit 103, a filter 105, and an alarm display unit 107.

Alarm system 100 manages the alarms generated corresponding to anomalies and failures occurring in a system being monitored and suppresses the redundant alarms. Process control unit 101 and FDI unit 103 receive inputs from sensors (not shown in FIG. 1) fitted in the monitored system. Process control unit 101 detects anomalies in the monitored system and generates alarms corresponding to the detected anomalies. FDI unit 103 diagnoses failures occurring in the monitored system and dynamically generates a failure-cause-effect graph corresponding to the diagnosed failures. Filter 105 looks up each alarm generated by process control unit 101 in the failure-cause-effect graph and identifies redundant and not-yet-classified alarms. The identified redundant alarms are suppressed, whereas the non-redundant and the not-yet-classified ones are displayed.

The alarm system provided by the invention may be employed in any system containing a failure monitoring mechanism to detect system failures. Examples of such systems include large scale or small-scale plants, or networks. Large scale or small-scale plants include processing plants, nuclear plants and manufacturing plants. A network includes a wireless network, or a computer network, such as Ethernet LAN, WAN and the Internet.

Process control unit 101 detects anomalies in the monitored system. An anomaly is an undesirable state or behaviour of the monitored system, which can be indicated by the monitored system's process variables exceeding a threshold value. An anomaly is an indicator of a failure in some cases. In other situations, anomalies represent short-term process deviations in the monitored system and do not indicate any critical failures. Examples of anomalies detected in a processing plant include boiler temperature exceeding its threshold value, pipe pressure becoming low, etc.

In an embodiment of the present invention, process control unit 101 can be a Supervisory Control and Data Acquisition (SCADA) unit. SCADA is a process control application that collects data from the sensors located on a system shop floor or in remote locations and sends the collected data to a central processor for management and control. SCADA unit resides on the central processor, which receives information from sensors, determines the control requirements of the monitored system and sends commands to control actuators.

In an embodiment of the present invention, process control unit 101 receives input regarding the states of the process variables via sensors fitted in different parts of the monitored system. Process control unit 101 generates an alarm corresponding to each detected anomaly.

FDI unit 103 performs the diagnosis and isolation of the failures occurring in the monitored system. Failure diagnosis and isolation is performed by using methods including expert systems, theorem provers, mathematical and control theoretical models, neural networks, fuzzy logic, and simulators, or combinations thereof, collaborating for example, in the form of a multi-agent system. An exemplary method for fault diagnosis and isolation is described in the IEEE paper titled 'Dynamic functional-link neural networks genetically evolved applied to fault diagnosis', authored by T. Marcu, B. Köppen-Seliger, P. M. Frank and S. X. Ding and presented at the $7^{th}$ European Control Conference ECC'03, Sep. 1-4, 2003, University of Cambridge, UK.

FDI unit 103 produces hypotheses regarding the diagnosed failure type and its location, based on a variety of inputs. The input data comprises current and historical measured values of the process variables and simulation results obtained via sensors fitted in different parts of the system.

In an exemplary embodiment of the invention, FDI unit 103 dynamically generates the failure-cause-effect graph, which comprises a list of alarms corresponding to each diagnosed failure, along with the alarms corresponding to the possible causes and effects of the diagnosed failure. It is to be noted that an alarm listed in the failure-cause-effect graph corresponds to a diagnosed failure, i.e., 'a first alarm is a cause or an effect of a second alarm' is equivalently expressed, as 'a first failure corresponding to a first alarm is a cause or an effect of a second failure corresponding to a second alarm'.

In an alternate embodiment of the invention, FDI unit 103 dynamically generates the failure-cause-effect graph, which comprises a list of diagnosed failures, along with the possible causes and effects of the diagnosed failure.

In alternate embodiments, FDI unit 103 can generate a data structure such as a table or a chart for listing the diagnosed failures along with their causes and effects. FDI unit 103 updates this graph concurrently with the generation of alarms by process control unit 101 and the diagnosis of failures by FDI unit 103. In particular, the graph is updated whenever a new hypothesis of failure becomes available to FDI unit 103. The new hypothesis of failure is based upon additional information from the sensors providing inputs to FDI unit 103.

Filter 105 receives the alarms generated by process control unit 101 and the cause-effect-graph generated by FDI unit 103. Filter 105 then identifies the redundant and the not-yet-classified alarms from the received alarms by using the failure-cause-effect graph. Next, filter 105 suppresses the redundant alarms and passes on non-redundant and the not-yet-classified alarms to alarm display unit 107. Hence, filter 105 prevents a large number of redundant alarms from being displayed to a user managing the monitored system. Only the alarms identified as non-redundant or not-yet-classified are displayed.

In an embodiment of the present invention, filter 105 is implemented in hardware, software, or in a combination of hardware and software, by a computing system. The computing system includes a processor and a memory for storing computer-readable instructions. The processor includes one or more general or special purpose processors, such as a Pentium®, Centrino®, Power PC®, digital signal processor (DSP) etc. The memory includes hard disk variants, floppy/compact disk variants, digital versatile disk (DVD) variants, smart cards, partially or fully hardened removable media, read only memory, random access memory, cache memory etc., in accordance with the requirements of a particular application. Various programming languages or other tools can also be utilized for implementing filter 105, such as those compatible with C variants (e.g., C++, C#), the Java 2 Platform, Enterprise Edition (J2EE) or other programming languages, in accordance with the requirements of a particular application.

Alarm display unit 107 receives the non-redundant and the not-yet-classified alarms from filter 105 and displays such alarms. In an embodiment of the present invention, the alarms are displayed to the user using an audio as well as a visual display system. In another embodiment, alarm display unit 107 also displays the redundant alarms suppressed by filter 105 and the reasons for suppressing them, for example, using visual representations of the failure-cause-effect graph.

FIG. 1b depicts an alarm system in accordance with an alternate embodiment of the invention. In this embodiment, process control unit 101 directly sends the generated alarms to alarm display unit 107. Alarm display unit 107 displays the received alarms. In addition, alarm display unit 107 makes the received alarms accessible to filter 105 for the suppression of the redundant alarms and the identification of the non-redundant and the not-yet-classified alarms. Filter 105 suppresses the redundant alarms from the alarms being displayed, and only the identified non-redundant and not-yet-classified alarms continue to be displayed by alarm display unit 107. Filter 105 works in parallel with alarm display unit 107 and therefore, does not create additional latency in displaying the non-redundant and the not-yet-classified alarms.

Figure 2:
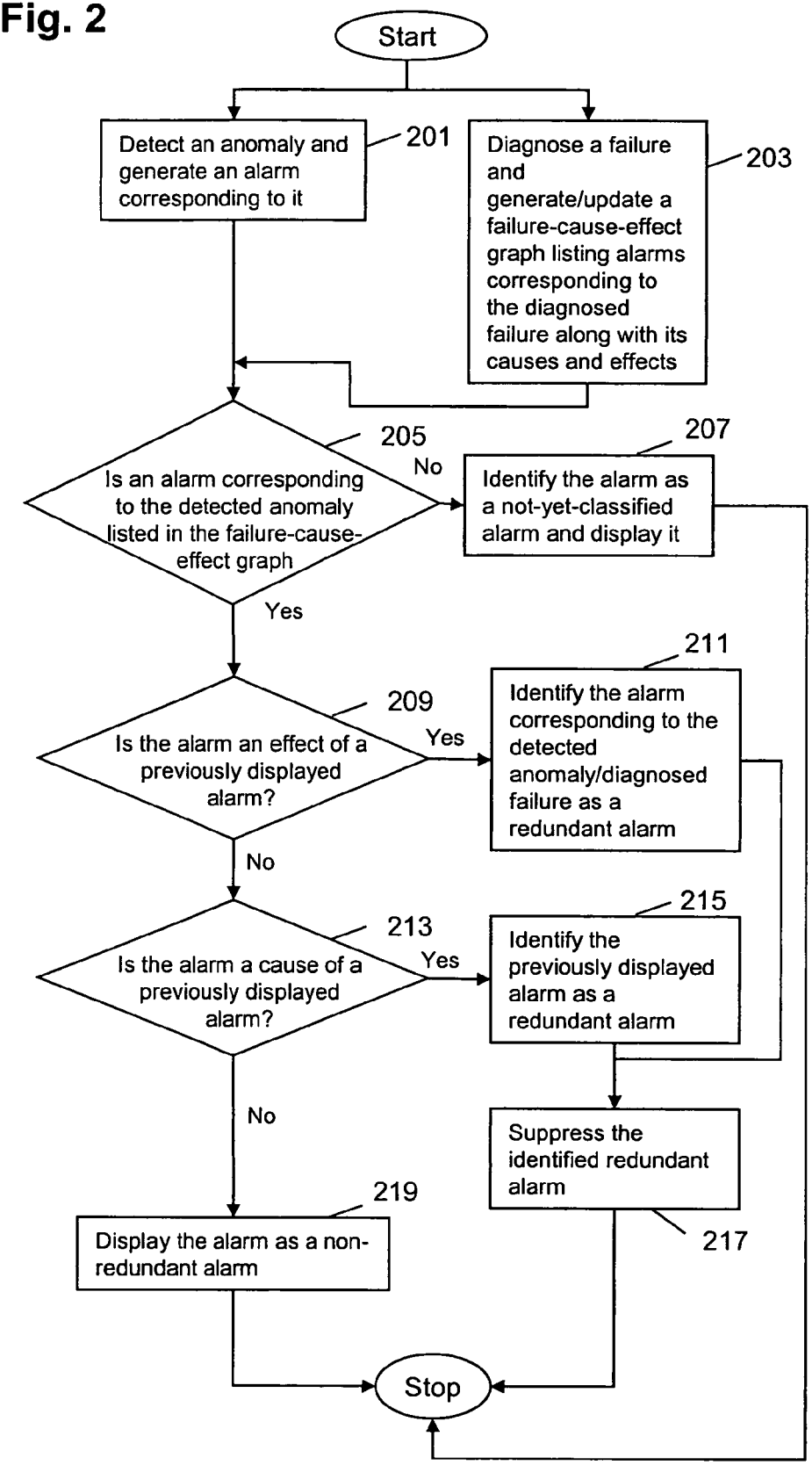

FIG. 2 depicts a flow chart for a method for dynamically suppressing redundant alarms, in accordance with the exemplary embodiment of the invention illustrated in FIG. 1a. In accordance with the exemplary embodiment, alarms are generated corresponding to each detected anomaly in the monitored system. However, only the identified non-redundant and not-yet-classified alarms are displayed, the rest being suppressed. In other words, the alarms identified as redundant alarms from amongst the generated alarms, are not displayed.

Process control unit 101 detects a multitude of anomalies and FDI unit 103 diagnoses a multitude of failures occurring in the monitored system. However, for the purpose of illustration, FIGS. 2 and 3 have been described assuming a single anomaly and a single failure. It will be apparent to a person skilled in the art that the method described in FIGS. 2 and 3 can be extended to a scenario, wherein there are more than one anomaly and failure.

At step 201, process control unit 101 detects an anomaly, and an alarm corresponding to the detected anomaly is generated. At step 203, FDI unit 103 diagnoses a failure in the monitored system and generates a failure-cause-effect graph. Steps 201 and 203 are performed concurrently.

Next, at step 205, it is determined whether the alarm corresponding to the detected anomaly is listed in the failure-cause-effect graph or not. In order to accomplish this, filter 105 looks up the failure-cause-effect graph to determine whether the alarm is listed in the graph. If the alarm is not listed in the graph, then at step 207, the alarm is identified as a not-yet-classified alarm and displayed via alarm display unit 107.

If the alarm corresponding to the detected anomaly is listed in the failure-cause-effect graph then, filter 105 identifies whether the alarm is a redundant alarm or not. In accordance with one embodiment of the invention, filter 105 identifies the redundant alarms by performing a comparison or logical classification of an alarm corresponding to a detected anomaly. The classification is done to classify each alarm as either corresponding to at least one cause and at least one effect of a diagnosed system failure listed in the failure-cause-effect graph.

At step 209, it is determined whether the alarm corresponding to the detected anomaly is an effect of a previously displayed alarm or not. The previously displayed alarm corresponds to a previously detected anomaly or a previously diagnosed failure, wherein the previously detected anomaly can be a symptom of a later diagnosed failure. Therefore, it is determined whether the detected anomaly is an effect of a previously detected anomaly or a previously diagnosed failure or not. If the alarm is an effect of a previously displayed alarm, then the alarm is identified as a redundant alarm at step 211. At step 217, the identified redundant alarm is suppressed, and hence, is prevented from being displayed.

If the alarm generated corresponding to the diagnosed failure is not an effect of a previously generated alarm, step 213 is performed. At step 213, it is determined whether the alarm corresponding to the detected anomaly is a cause of a previously displayed alarm or not. Therefore, it is determined whether the detected anomaly is a cause of a previously detected anomaly or a previously diagnosed failure or not. If the alarm is a cause of any previously displayed alarm, the previously displayed alarm, which corresponds to a previously diagnosed failure, is identified as a redundant alarm at step 215. At step 217, the identified redundant alarm is suppressed and hence, is prevented from being displayed.

If the alarm corresponding to the detected anomaly is neither a cause nor an effect of a previously displayed alarm, then at step 219 the alarm is identified as a non-redundant alarm and is displayed via alarm display unit 107.

Figure 3:
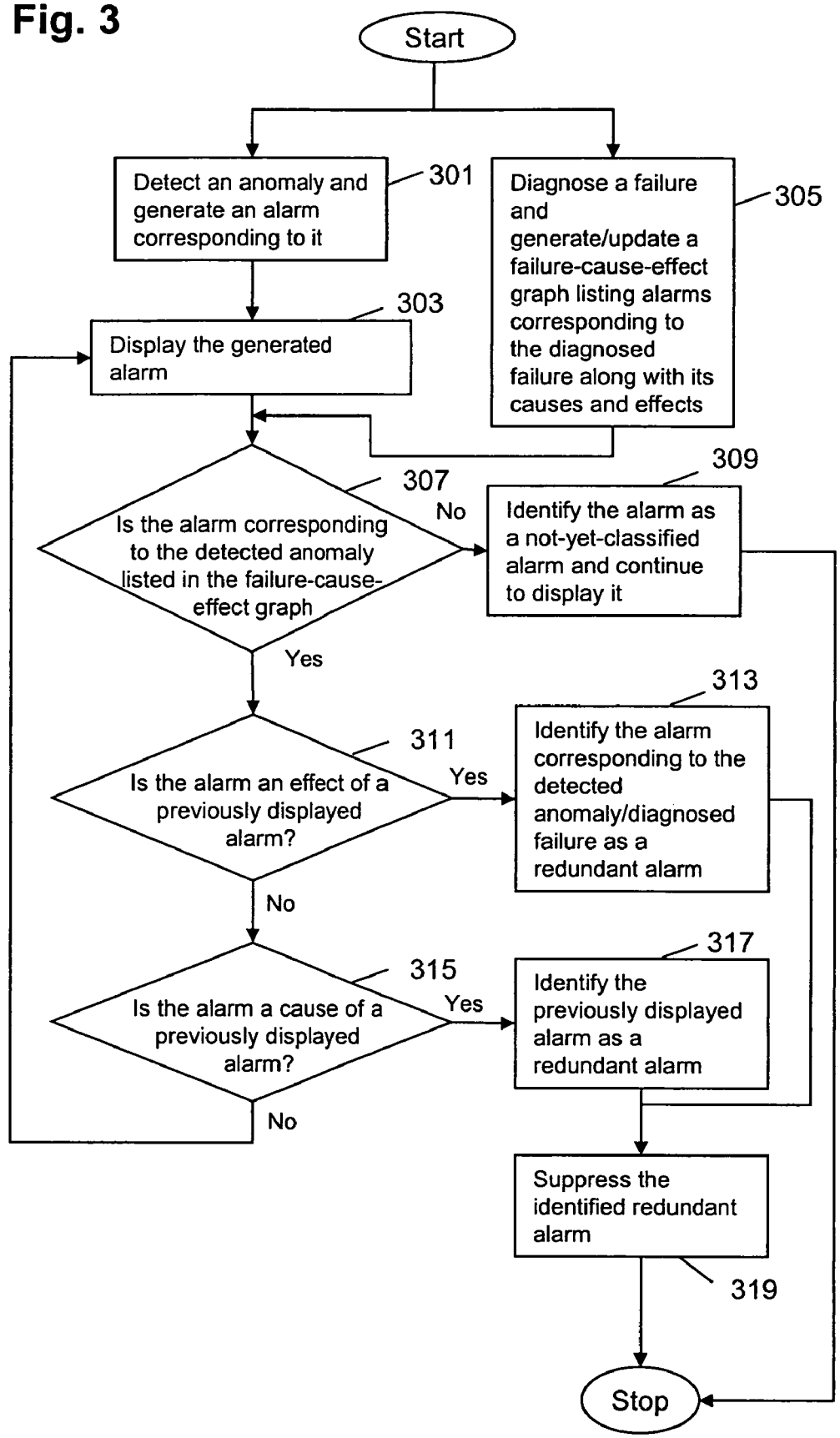
FIG. 3 depicts a flow chart for a method for dynamically suppressing redundant alarms, in accordance with another exemplary embodiment of the invention illustrated in FIG. 1b.

FIG. 3 depicts a flow chart for a method for dynamically suppressing redundant alarms, in accordance with another exemplary embodiment of the invention illustrated in FIG. 1b. In accordance with the exemplary embodiment, alarms generated corresponding to each detected anomaly at step 301 are displayed at step 303. Next not-yet-classified and redundant alarms are identified at steps 307 and 311 respectively using the failure-cause-effect graph generated at step 305. At step 307, it is determined whether the alarm being displayed is listed in the failure-cause-effect graph or not. If the alarm being displayed is not listed in the failure-cause-effect graph, it is identified as a not-yet-classified alarm at step 309 and is continued to be displayed. At steps 311 and 315, it is determined whether the alarm being displayed is a cause or an effect of a previously displayed alarm or not. If the alarm is an effect of a previously displayed alarm, it is identified as a redundant alarm at step 313. If the alarm is determined to be a cause of a previously displayed alarm, the previously displayed alarm is identified as a redundant alarm at step 317. At step 319, the identified redundant alarms are suppressed. Therefore, in accordance with the embodiment of the present invention, the alarms identified as redundant from amongst the alarms being displayed are suppressed, while, the rest continue to be displayed.

It will also be appreciated that one or more of the elements and steps, depicted in the drawings/figures, can be implemented in a more separated or integrated manner, or even removed or rendered as inoperable in certain cases, as is useful, in accordance with a particular application. Additionally, any signal arrows in the drawings/figures should be considered only as exemplary, and not limiting, unless otherwise specifically noted. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Figure 4:
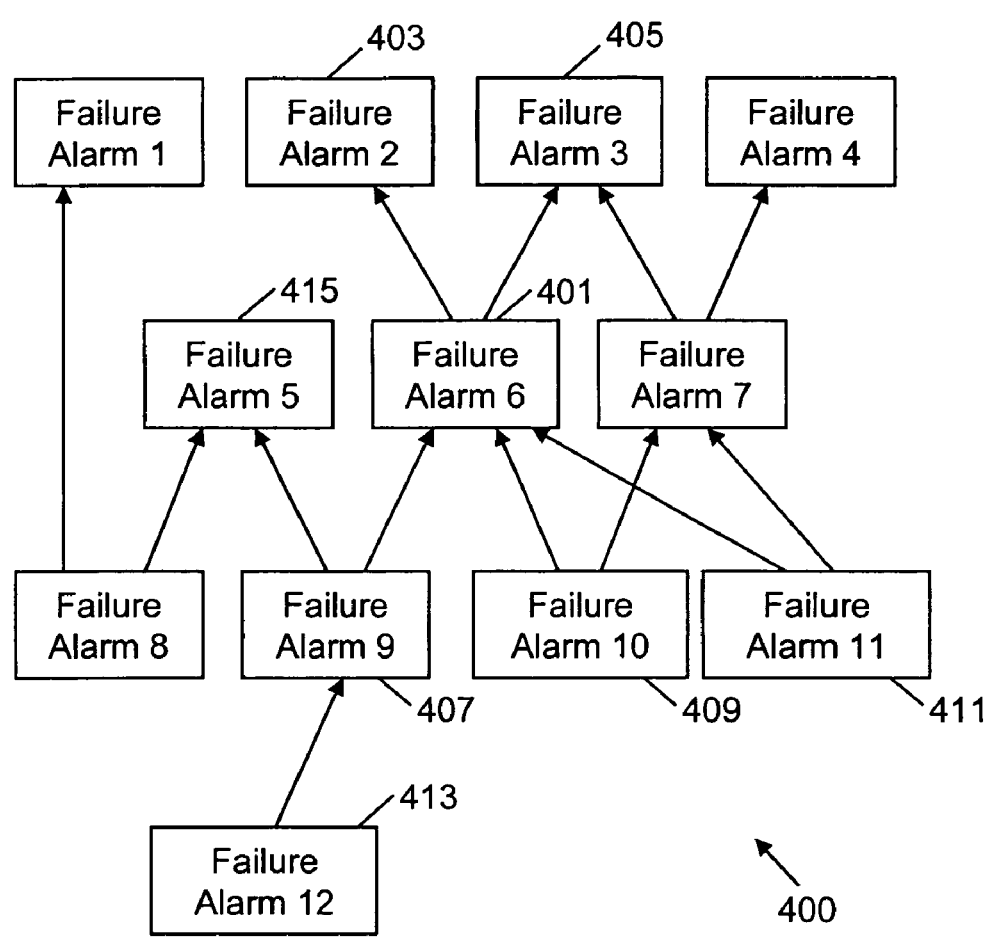
FIG. 4 depicts an exemplary failure-cause-effect graph, in accordance with an exemplary embodiment of the invention.

FIG. 4 depicts an exemplary failure-cause-effect graph, in accordance with an embodiment of the invention. Alarms generated, corresponding to each diagnosed failure (failure alarms) and their possible causes and effects are listed in the failure-cause-effect graph 400. In FIG. 4, arrows point from a cause of a failure alarm to a possible effect of the failure alarm. A failure alarm with more than one outbound arrow signifies that there are several possible effects of the failure alarm. A failure alarm with more than one inbound arrow signifies that there are several possible causes of the failure alarm.

For the purpose of illustration, it is assumed that process control unit 101 detects an anomaly, and failure alarm 401 is displayed, corresponding to the detected anomaly at a particular instant. Failure alarms 403 and 405 correspond to failures, which are direct consequences of the detected anomaly, and are identified as the possible effects of failure alarm 401. Failure alarms 407, 409 and 411 correspond to failures, which are the possible causes of the detected anomaly and are identified as the possible causes of failure alarm 401 from failure-cause-effect graph 400.

As a result, if process control unit 101 detects an anomaly, which corresponds to failure alarm 403 at a later instant, then failure alarm 403 is identified as a redundant alarm and is suppressed. This is because failure alarm 403 corresponds to a failure, which is a direct consequence of the anomaly, detected at the earlier instant. In other words, failure alarm 403 is an effect of the previously displayed failure alarm 401, and hence, is identified as a redundant alarm.

On the other hand, if process control unit 101 detects an anomaly, which corresponds to failure alarm 407 at a later instant, failure alarm 401 is identified as a redundant alarm and is suppressed. Failure alarm 407 corresponds to a failure, which is a cause of the anomaly detected at the earlier instant. Hence, failure alarm 401 is identified as a redundant alarm because it is an effect of the newly displayed failure alarm 407. Hence, failure alarm 407 is displayed via alarm display unit 107, whereas failure alarm 401 is suppressed.

Next, failure alarms 413 and 415 are determined as a cause and an effect of failure alarm 407 respectively, and failurecause-effect graph 400 is used, as described above, for determining the redundant alarms from the subsequently generated alarms.

Therefore, the present invention suppresses the redundant alarms in the monitored system and prevents a large number of alarms from being displayed to a user managing the monitored system. The invention makes use of the failure-cause-effect graph generated by FDI unit 103 to suppress the redundant alarms instead of relying on purely mechanistic suppression schemes. For identifying the redundant alarms, both the causes and effects of a generated alarm are identified. A previously generated alarm is suppressed if a newly generated alarm is close to the root cause of the failure causing the previously generated alarm. The invention also makes use of the alarm prediction made by FDI unit 103, so that, if a newly generated alarm is already expected as an effect of a previously generated alarm, it is directly suppressed.

As a result, only the most relevant alarms to which the user needs to react with counter-actions are displayed. The invention also reduces the risk of ignoring concurrent anomalies and failures occurring in the monitored system.

LIST OF DESIGNATIONS

101 Process Control Unit
103 FDI
105 Filter
107 Alarm Display Unit
201 System anomaly detection and alarm generation step
203 System failure diagnosis and failure-cause-effect graph generation step
205 Not-yet-classified alarm determination step
207 Display of not-yet-classified alarm step
209 Determination of an alarm being an effect of a previously generated alarm step
211 Identification of the alarm as a redundant alarm step
213 Determination of an alarm being a cause of a previously generated alarm step
215 Identification of the previously generated alarm as a redundant alarm step
217 Suppression of the redundant alarm step
219 Display of non-redundant alarm step
301 System anomaly detection step
303 Alarm display step
305 System failure diagnosis and failure-cause-effect graph generation step
307 Not-yet-classified alarm determination step
309 Display of not-yet-classified alarm step
311 Determination of an alarm being an effect of a previously generated alarm step
313 Identification of the alarm as a redundant alarm step
315 Determination of an alarm being a cause of a previously generated alarm step
317 Identification of the previously generated alarm as a redundant alarm step
319 Suppression of the redundant alarm step
401 Failure alarm 6
403 Failure alarm 2
405 Failure alarm 3
407 Failure alarm 9
409 Failure alarm 10
411 Failure alarm 11
413 Failure alarm 13

The invention claimed is:

1. An alarm system capable of suppressing redundant alarms, the alarm system comprising:
at least one process control unit for detecting system anomalies and generating alarms corresponding to the detected system anomalies;
a Fault Diagnosis and Isolation (FDI) unit for diagnosing a plurality of system failures, the FDI unit capable of generating a failure-cause-effect graph comprising alarms corresponding to at least one cause and at least one effect of each of a plurality of diagnosed system failures;
a filter coupled to the FDI unit and the process control unit, the filter receiving alarms generated by the at least one process control unit and the failure-cause-effect graph generated by the FII unit, and the filter managing alarms based upon the identification of redundant alarms and not-yet-classified alarms using the generated failure-cause-effect graph, wherein an alarm corresponding to a detected anomaly is identified as a not-yet-classified alarm if the alarm corresponding to the detected anomaly is not listed in the failure-cause-effect graph; and
at least one alarm display unit coupled to the filter, the alarm display unit displaying the identified not-yet-classified alarms and non-redundant alarms, wherein the generated redundant alarms are suppressed by the filter from being displayed by the at least one alarm display unit.

2. The alarm system according to claim 1, wherein the FDI unit dynamically updates the failure-cause-effect graph concurrently with the generation of alarms by the process control unit and the diagnosis of failures by the FDI unit.

3. The alarm system according to claim 1, wherein the identification of redundant alarms by using the generated failure-cause-effect graph comprises a comparison or logical classification of an alarm corresponding to a detected anomaly with respect to the alarms corresponding to at least one cause and at least one effect of a diagnosed system failure.

4. The alarm system according to claim 3, wherein a previously displayed alarm is identified as a redundant alarm if a new alarm corresponding to a detected anomaly is diagnosed as a cause of the previously displayed alarm.

5. The alarm system according to claim 3, wherein an alarm corresponding to a detected anomaly is identified as a redundant alarm if it is one of the determined effects of a previously displayed alarm.

6. The alarm system according to claim 3, wherein an alarm previously identified as a redundant or a not-yet-classified alarm is re-identified as a redundant or a non-redundant alarm when the failure-cause-effect graph is updated.

7. The alarm system according to claim 1, wherein the alarm display unit displays at least one reason for suppressing the redundant alarms.

8. A method of dynamically suppressing redundant alarms in a system having at least one processing control unit, a fault diagnosis and isolation (FDI) unit, and a filter connected to the at least one processing control unit and the FID unit,
the method using a failure-cause-effect graph generated by the FDI unit and comprising alarms corresponding to at least one cause and at least one effect of each of a plurality of failures diagnosed in the system,
the failure-cause-effect graph being dynamically updated concurrently with the generation of alarms and the diagnosis of failures,
the method comprising the steps of:
detecting, in the at least one processing control unit, at least one anomaly in the system;
diagnosing, in the FDI unit, at least one system failure;

receiving in the filter alarms generated by the at least one process control unit and the failure-cause-effect graph generated by the FDI unit;

identifying, in the filter, a received alarm generated in correspondence with a detected anomaly as a not-yet-classified alarm if the alarm corresponding to the detected anomaly is not listed in the failure-cause-effect graph;

identifying, in the filter, a received alarm generated in correspondence with a detected anomaly as a redundant alarm by comparison or logical classification of the alarm with respect to alarms corresponding to at least one cause and at least one effect of a diagnosed system failure listed in the failure-cause-effect graph;

suppressing, in the filter, the identified redundant alarm generated in correspondence with a detected anomaly; and displaying a non-redundant alarm and the identified not-yet-classified alarm.

9. The method according to claim 8, wherein an alarm corresponding to a detected anomaly is identified as a redundant alarm if it is one of the determined effects of a previously displayed alarm.

10. The method according to claim 8, wherein a previously displayed alarm is identified as a redundant alarm if a new alarm corresponding to a detected anomaly is diagnosed as a causes of the previously displayed alarm.

11. A computer program product, comprising a non-transitory computer usable medium having a computer readable program code embodied therein, for dynamically suppressing redundant alarms in a computer system having at least one processing control unit, a fault diagnosis and isolation (FDI unit, and a filter connected to the at least one processing control unit and the FDI unit, by using a failure-cause-effect graph generated by the FID unit and comprising alarms corresponding to at least one cause and at least one effect of each of a plurality of failures diagnosed in the system, the failure-cause-effect graph being dynamically updated concurrently with the generation of alarms and the diagnosis of failures, the computer program product causing a computer in the computer system to execute a method for dynamically suppressing redundant alarms, the method comprising:

detecting at least one anomaly in the system;

diagnosing at least one system failure;

receiving alarms generated by the at least one process control unit and the failure-cause-effect graph generated by the FDI unit;

identifying a received alarm generated in correspondence with a detected anomaly as a not-yet-classified alarm if the alarm corresponding to the detected anomaly is not listed in the failure-cause-effect graph;

identifying a received alarm generated in correspondence with a detected anomaly as a redundant alarm by comparison or logical classification of the alarm with respect to alarms corresponding to at least one cause and at least one effect of a diagnosed system failure listed in the failure-cause-effect graph;

suppressing the identified redundant alarm generated in correspondence with the detected anomaly; and displaying a non-redundant alarm and the identified not-yet-classified alarm.

* * * * *